US011501753B2

United States Patent
Shen et al.

(10) Patent No.: US 11,501,753 B2
(45) Date of Patent: Nov. 15, 2022

(54) SYSTEM AND METHOD FOR AUTOMATING NATURAL LANGUAGE UNDERSTANDING (NLU) IN SKILL DEVELOPMENT

(71) Applicant: Samsung Electronics Co., Ltd., Suwon-si (KR)

(72) Inventors: Yilin Shen, Santa Clara, CA (US); Avik Ray, Sunnyvale, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 16/728,672

(22) Filed: Dec. 27, 2019

(65) Prior Publication Data

US 2020/0410986 A1   Dec. 31, 2020

Related U.S. Application Data

(60) Provisional application No. 62/867,019, filed on Jun. 26, 2019.

(51) Int. Cl.
*G10L 15/06* (2013.01)
*G10L 15/22* (2006.01)
(Continued)

(52) U.S. Cl.
CPC ............ *G10L 15/063* (2013.01); *G06N 20/00* (2019.01); *G10L 15/04* (2013.01);
(Continued)

(58) Field of Classification Search
CPC ... G10L 15/063; G10L 15/04; G10L 15/1822; G10L 15/22; G10L 2015/0638; G06N 20/00
See application file for complete search history.

(56) References Cited

U.S. PATENT DOCUMENTS 5,357,596 A * 10/1994 Takebayashi ............. G06F 3/16
704/E15.045
7,127,402 B2   10/2006 Ross et al.
(Continued)

FOREIGN PATENT DOCUMENTS

KR   10-2019-0057792 A   5/2019

OTHER PUBLICATIONS

International Search Report and Written Opinion of the International Searching Authority in connection with International Patent Application No. PCT/KR2020/003696 dated Jul. 2, 2020, 10 pages.
(Continued)

*Primary Examiner* — Michael Colucci (57) ABSTRACT

A method includes receiving, from an electronic device, information defining a user utterance associated with a skill to be performed, where the skill is not recognized by a natural language understanding (NLU) engine. The method also includes receiving, from the electronic device, information defining one or more actions for performing the skill. The method further includes identifying, using at least one processor, one or more known skills having one or more slots that map to at least one word or phrase in the user utterance. The method also includes creating, using the at least one processor, a plurality of additional utterances based on the one or more mapped slots. In addition, the method includes training, using the at least one processor, the NLU engine using the plurality of additional utterances.

20 Claims, 7 Drawing Sheets

(51) Int. Cl.
*G10L 15/04* (2013.01)
*G06N 20/00* (2019.01)
*G10L 15/18* (2013.01)

(52) U.S. Cl.
CPC .......... *G10L 15/1822* (2013.01); *G10L 15/22* (2013.01); *G10L 2015/0638* (2013.01)

(56) References Cited

U.S. PATENT DOCUMENTS

| | | |
|---|---|---|
| 7,149,690 B2 | 12/2006 | August et al. |
| 8,407,057 B2 | 3/2013 | Comerford et al. |
| 8,484,025 B1 | 7/2013 | Moreno Mengibar et al. |
| 8,738,377 B2 | 5/2014 | Byrne et al. |
| 8,738,379 B2 | 5/2014 | Tur |
| 9,070,366 B1 | 6/2015 | Mathias et al. |
| 9,378,732 B2 | 6/2016 | Hakkani-Tur et al. |
| 10,191,999 B2 | 1/2019 | Liu et al. |
| 11,158,307 B1* | 10/2021 | Ghias .................. G06N 3/0445 |
| 2006/0057545 A1 | 3/2006 | Mozer et al. |
| 2010/0042404 A1 | 2/2010 | Gupta et al. |
| 2011/0060587 A1* | 3/2011 | Phillips .................. G10L 15/30 704/235 |
| 2014/0180677 A1* | 6/2014 | McCaffrey ............ G06F 40/247 704/9 |
| 2014/0201629 A1 | 7/2014 | Heck |
| 2014/0253455 A1 | 9/2014 | Mauro et al. |
| 2014/0297282 A1* | 10/2014 | Peters .................... G10L 15/19 704/254 |
| 2014/0350304 A1 | 11/2014 | Wu et al. |
| 2017/0148441 A1* | 5/2017 | Fujii .................. G10L 15/1815 |
| 2017/0200455 A1 | 7/2017 | Aggarwal et al. |
| 2017/0371861 A1* | 12/2017 | Barborak ................ G06F 16/22 |
| 2017/0372199 A1* | 12/2017 | Hakkani-Tur ........... G06N 3/08 |
| 2019/0019112 A1 | 1/2019 | Gelfenbeyn et al. |
| 2019/0095428 A1* | 3/2019 | Asano .................... G06N 3/008 |
| 2019/0115015 A1 | 4/2019 | Yae |
| 2019/0155907 A1 | 5/2019 | Park et al. |

OTHER PUBLICATIONS

Bapna et al., "Towards Zero-Shot Frame Semantic Parsing for Domain Scaling", Interspeech, 2017, 5 pages.

Ray et al., "System and Method for Complex Task Machine Learning", U.S. Appl. No. 16/661,827, filed Oct. 23, 2019, 60 pages.

* cited by examiner

SYSTEM AND METHOD FOR AUTOMATING NATURAL LANGUAGE UNDERSTANDING (NLU) IN SKILL DEVELOPMENT

CROSS-REFERENCE TO RELATED APPLICATION AND CLAIM OF PRIORITY

This application claims priority under 35 U.S.C. § 119(e) to U.S. Provisional Patent Application No. 62/867,019 filed on Jun. 26, 2019, which is hereby incorporated by reference in its entirety.

TECHNICAL FIELD

This disclosure relates generally to machine learning systems. More specifically, this disclosure relates to a system and method for automating natural language understanding (NLU) in skill development.

BACKGROUND

Natural language understanding (NLU) is a key component of modern digital personal assistants to enable them to convert users' natural language commands into actions. For example, natural language understanding is typically used to enable a machine to understand a user's utterance, identify the intent of the user's utterance, and perform one or more actions to satisfy the intent of the user's utterance. Digital personal assistants often rely completely on software developers to build new skills, where each skill defines one or more actions for satisfying a particular intent (which may be expressed using a variety of natural language utterances). Typically, the development of each new skill involves the manual creation and input of a collection of training utterances to an NLU engine associated with the new skill. The training utterances teach the NLU engine how to recognize the intent of various user utterances related to the new skill.

SUMMARY

This disclosure provides a system and method for automating natural language understanding (NLU) in skill development.

In a first embodiment, a method includes receiving, from an electronic device, information defining a user utterance associated with a skill to be performed, where the skill is not recognized by an NLU engine. The method also includes receiving, from the electronic device, information defining one or more actions for performing the skill. The method further includes identifying, using at least one processor, one or more known skills having one or more slots that map to at least one word or phrase in the user utterance. The method also includes creating, using the at least one processor, a plurality of additional utterances based on the one or more mapped slots. In addition, the method includes training, using the at least one processor, the NLU engine using the plurality of additional utterances.

In a second embodiment, an apparatus includes at least one memory and at least one processor operatively coupled to the at least one memory. The at least one processor is configured to receive, from an electronic device, information defining a user utterance associated with a skill to be performed, where the skill is not recognized by an NLU engine. The at least one processor is also configured to receive, from the electronic device, information defining one or more actions for performing the skill. The at least one processor is further configured to identify one or more known skills having one or more slots that map to at least one word or phrase in the user utterance. In addition, the at least one processor is configured to create a plurality of additional utterances based on the one or more mapped slots and train the NLU engine using the plurality of additional utterances.

In a third embodiment, a non-transitory machine-readable medium contains instructions that when executed cause at least one processor of a host device to receive, from an electronic device, information defining a user utterance associated with a skill to be performed, where the skill is not recognized by an NLU engine. The medium also contains instructions that when executed cause the at least one processor to receive, from the electronic device, information defining one or more actions for performing the skill. The medium further contains instructions that when executed cause the at least one processor to identify one or more known skills having one or more slots that map to at least one word or phrase in the user utterance. In addition, the medium also contains instructions that when executed cause the at least one processor to create a plurality of additional utterances based on the one or more mapped slots and train the NLU engine using the plurality of additional utterances.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, natural language understanding (NLU) is a key component of modern digital personal assistants to enable them to convert users' natural language commands into actions. Digital personal assistants often rely completely on software developers to build new skills, where each skill defines one or more actions for satisfying a particular intent (which may be expressed using a variety of natural language utterances). Typically, the development of each new skill involves the manual creation and input of a collection of training utterances to an NLU engine associated with the new skill. The training utterances teach the NLU engine how to recognize the intent of various user utterances related to the new skill. Unfortunately, this typically requires the manual creation and input of various training utterances and annotations for slots of the various training utterances when developing each skill. This is often performed by software developers themselves or via crowdsourcing and can represent a time-consuming and expensive process. Not only that, it is often infeasible for software developers to pre-build ahead of time all possible skills that might be used to satisfy all users' needs in the future.

This disclosure provides various techniques for automating natural language understanding in skill development. More specifically, the techniques described in this disclosure automate NLU development so that a digital personal assistant or other system is able to automate the generation and annotation of natural language training utterances, which can then be used to train an NLU engine for a new skill. For each new skill, one or more sample utterances are received from one or more developers or other users, optionally along with a set of clarification instructions. In some embodiments, users may provide instructions or on-screen demonstrations for performing one or more actions associated with the new skill.

Each sample utterance is processed to identify one or more slots in the sample utterance, and a database of pre-built (pre-existing) skills is accessed. For each pre-built skill, the database may contain (i) annotated training utterances for that pre-built skill and (ii) a well-trained NLU engine for that pre-built skill. Each training utterance for a pre-built skill in the database may include intent and slot annotations, and a textual description may be provided for each slot. An analysis is conducted to identify whether any pre-built skills have one or more slots that match or otherwise map to the one or more slots of the sample utterance(s). If so, the training utterances for the identified pre-built skill(s) are used to generate multiple additional training utterances associated with the new skill. The additional training utterances can then be used to train an NLU engine for the new skill, and the new skill and its associated training utterances and NLU engine can be added back into the database.

In this way, annotated training utterances and an NLU engine for a new skill can be developed in an automated manner with reduced or minimized user input or user interaction. In some embodiments, a user may only need to provide one or more sample utterances for a new skill and demonstrate or provide instructions on how to perform one or more actions associated with the new skill. At that point, multiple (and possibly numerous) additional training utterances can be automatically generated based on the annotated training utterances associated with one or more pre-built skills, and an NLU engine for the new skill can be trained using the automatically-generated training utterances. Among other things, this helps to speed up the development of new skills and reduces or eliminates costly manual development tasks. Also, this helps to enable systems, in a real-time and on-demand manner, to learn new skills that they were not previously taught to perform. In addition, this allows end users, even those with limited or no natural language expertise, to quickly build high-quality new skills. The users can simply provide sample utterances and optionally clarifying instructions or other information, and this can be done in the same way that the users might ordinarily interact with digital personal assistants in their daily lives.

Figure 1:
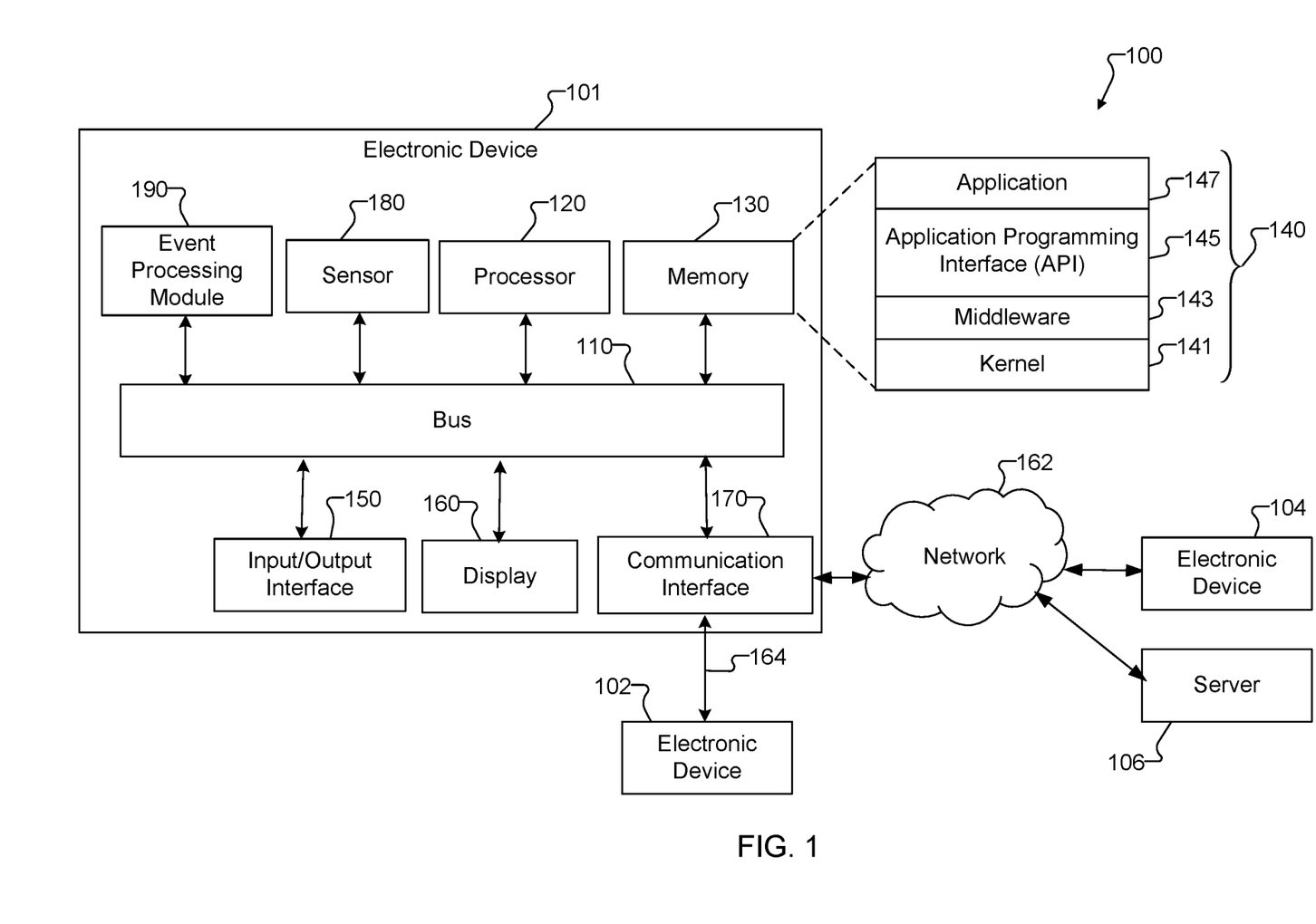
FIG. 1 illustrates an example network configuration in accordance with various embodiments of this disclosure.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (IO) interface 150, a display 160, a communication interface 170, a sensor 180, or an event processing module 190. In some embodiments, the electronic device 101 may exclude at least one of the components or may add another component.

The bus 110 includes a circuit for connecting the components 120-190 with one another and transferring communications (such as control messages and/or data) between the components. The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In accordance with various embodiments of this disclosure, the processor 120 can receive one or more sample utterances and information identifying how to perform one or more actions related to a new skill and provide this information to an NLU system, which generates training utterances for the new skill based on one or more pre-built skills and trains an NLU engine for the new skill. The processor 120 may also or alternatively perform at least some of the operations of the NLU system. Each new skill here relates to one or more actions to be performed by the electronic device 101 or other device(s), such as by a digital personal assistant executed on the electronic device 101, in order to satisfy the intent of the sample utterance(s) and the generated training utterances.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that receive information related to new skills and that interact with an NLU system to support automated generation of training utterances and NLU engine training, although the application(s) 147 may also support automated generation of training utterances and NLU engine training in the electronic device 101 itself. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more microphones, which may be used to capture utterances from one or more users. The sensor(s) 180 can also include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-190 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. The server 106 can also include an event processing module (not shown) that may support the event processing module 190 implemented in the electronic device 101. For example, the event processing module 190 can process at least a part of information obtained from other elements (such as the processor 120, the memory 130, the I/O interface 150, or the communication interface 170) and can provide the same to the user in various manners. In some embodiments, the server 106 may execute or implement an NLU system that receives information from the electronic device 101 related to new skills, generates training utterances for the new skills, and trains NLU engines to recognize user intents related to the new skills. The NLU engines may then be used by the electronic device 101, 102, 104 to perform actions in order to implement the new skills. This helps to support the generation and use of new skills by digital personal assistants or other systems.

While in FIG. 1 the event processing module 190 is shown to be a module separate from the processor 120, at least a portion of the event processing module 190 can be included or implemented in the processor 120 or at least one other module, or the overall function of the event processing module 190 can be included or implemented in the processor 120 or another processor. The event processing module 190 can perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
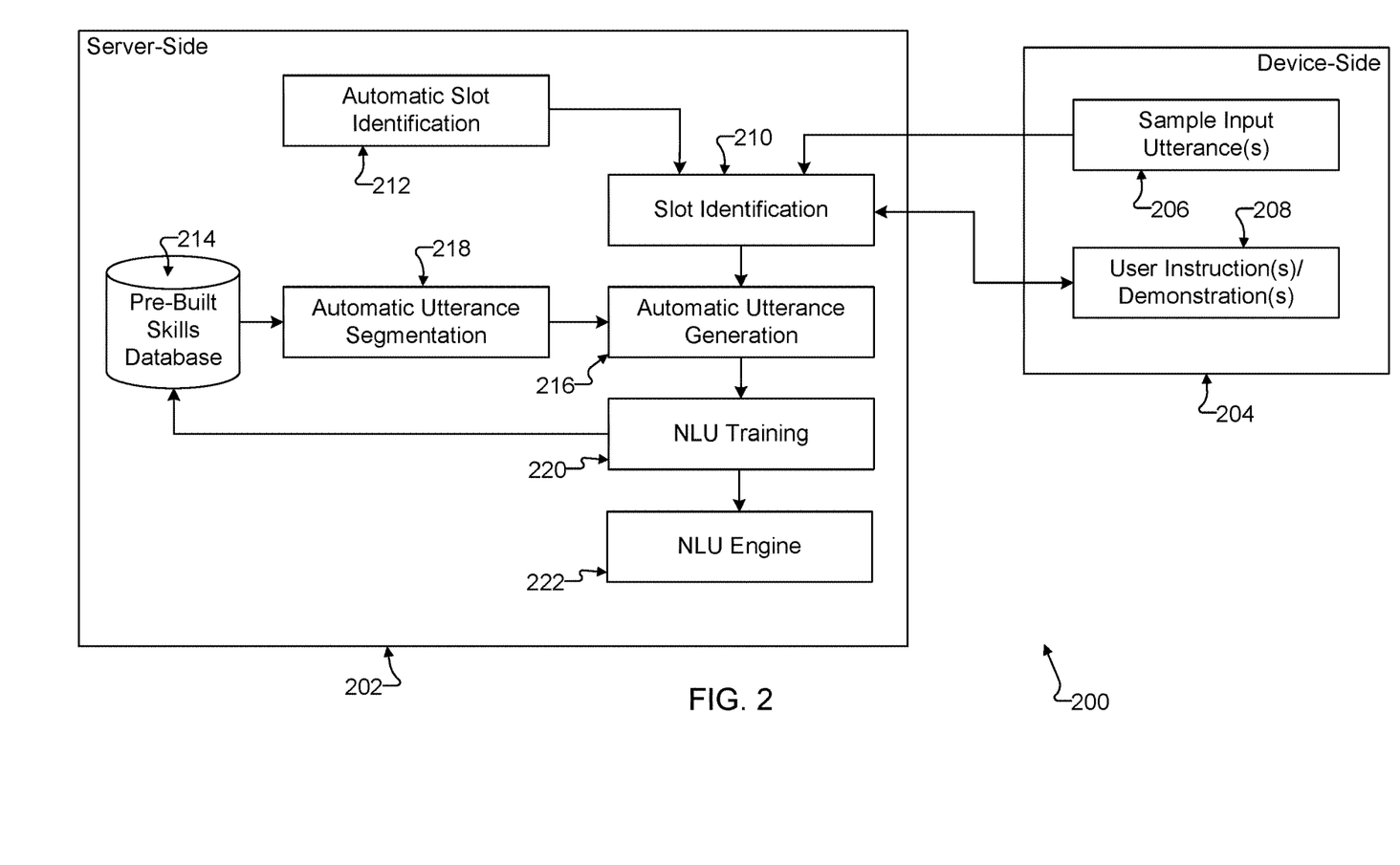
FIG. 2 illustrates an example architecture for automating natural language understanding (NLU) in skill development in accordance with various embodiments of this disclosure.

FIG. 2 illustrates an example architecture 200 for automating NLU in skill development in accordance with various embodiments of this disclosure. The architecture 200 includes at least one host device 202 and at least one electronic device 204. In some embodiments, the host device 202 can be the server 106 of FIG. 1, and the electronic device 204 can be the electronic device 101 of FIG. 1. In other embodiments, the host device 202 and the electronic device 204 can be a same device or entity. In still other embodiments, the host device 202 and the electronic device 204 can represent other devices configured to operate as described below.

As shown in FIG. 2, the electronic device 204 is used to provide information defining at least one sample input utterance 206 to the host device 202. A sample input utterance 206 can represent a user utterance or other user input that is being used to create a new skill for a digital personal assistant or other system. The sample input utterances 206 can be obtained by the electronic device 204 in any suitable manner, such as via a microphone (a sensor 180) of the electronic device 204 or via a textual input through a graphical user interface of the electronic device 204. Depending on the implementation and use, a single sample input utterance 206 or multiple sample input utterances 206 may be provided by the electronic device 204 to the host device 202. The information defining the sample input utterances 206 provided to and received by the host device 202 may include any suitable information, such as a digitized version of each sample input utterance 206 or a text-based representation of each sample input utterance 206.

The electronic device 204 is also used to provide information defining one or more instructions or user demonstrations 208 to the host device 202. The instructions or user demonstrations 208 identify how one or more actions associated with a new skill are to be performed in order to satisfy the user's intent, which is represented by the sample input utterance(s) 206. For example, clarifying instructions might be provided that define how each step of the new skill are to be performed. The instructions or user demonstrations 208 can be received by the electronic device 204 in any suitable manner, such as via textual input through a graphical user interface or via a recording or monitoring of user interactions with at least one application during a demonstration. The information defining the instructions or user demonstrations 208 provided to and received by the host device 202 may include any suitable information, such as textual instructions or indications of what the user did during a demonstration. The instructions or user demonstrations 208 may be received by the electronic device 204 in response to a prompt from the electronic device 204 (such as in response to the electronic device 204 or the host device 202 determining that at least one sample input utterance 206 relates to an unrecognized skill) or at the user's own invocation.

The information from the electronic device 204 is received by a slot identification function 210 of the host device 202. The slot identification function 210 can interact with an automatic slot identification function 212 of the host device 202. With respect to NLU, an utterance is typically associated with an intent and one or more slots. The intent typically represents a goal associated with the utterance, while each slot typically represents a word or phrase in the utterance that maps to a specific type of information. The slot identification function 210 and the automatic slot identification function 212 generally operate to identify one or more slots that are contained in the sample input utterance(s) 206 received from the electronic device 204. As a particular example, a user may provide a sample input utterance 206 of "find a five star hotel near San Jose." The phrase "five star" can be mapped to an @rating slot, and the phrase "near San Jose" can be mapped to an @location slot.

The automatic slot identification function 212 here can process the information defining the sample input utterance (s) 206 to automatically identify one or more possible slots in the input utterance(s) 206. The slot identification function 210 can receive the possible slots from the automatic slot identification function 212 and, if necessary, request confirmation or selection of one or more specific slots from a user via the electronic device 204. For example, if the automatic slot identification function 212 identifies multiple possible slots for the same word or phrase in an input utterance 206, the automatic slot identification function 212 or the slot identification function 210 may rank the possible slots and request that the user select one of the ranked slots for subsequent use.

The host device 202 also includes or has access to a database 214 of pre-built skills, which represent previously-defined skills. The database 214 may contain any suitable information defining or otherwise associated with the pre-built skills. In some embodiments, for each pre-built skill, the database 214 contains a well-trained NLU engine for that pre-built skill and annotated training utterances for that pre-built skill (where the NLU engine was typically trained using the associated annotated training utterances). For each training utterance for each pre-built skill, the database 214 may identify intent and slot annotations for that training utterance, and a textual description may be included for each slot. Note that while shown as residing within the host device 202, the database 214 may reside at any suitable location(s) accessible by the host device 202.

In some embodiments, the slot identification function 210 and/or the automatic slot identification function 212 of the host device 202 accesses the database 214 in order to support the automated identification of slots in the sample input utterances 206. For example, the slots of the training utterances that are stored in the database 214 for each skill may be annotated and known. The slot identification function 210 and/or the automatic slot identification function 212 may therefore select one or more words or phrases in a sample input utterance 206 and compare those words or phrases to the known slots of the training utterances in the database 214. If any known slots of the training utterances in the database 214 are the same as or similar to the words or phrases in the sample input utterance 206, those slots may be identified as being contained in the sample input utterance 206. In particular embodiments, the slot identification function 210 and/or the automatic slot identification function 212 maps each slot word in the sample input utterance 206 to a single slot type in the training data based on the overall sentence context. If no such mapping is found with sufficiently high confidence, a list of candidate slot types can be identified and provides to a user to select the most appropriate type as described above.

In particular embodiments, one or more slots of a sample input utterance 206 may be identified by the automatic slot identification function 212 as follows. A set of natural language utterances can be constructed by replacing words or phrases in the sample input utterance 206 with other related or optional values. The optional words or phrases used here may be based on contents of the database 214 or other source(s) of information. Next, for each constructed utterance in the set, a slot tagging operation can occur in which semantic slots are extracted from the constructed utterance based on slot descriptions. In some embodiments, a zero-shot model can be trained using the pre-built skills in the database 214 and used to perform zero-shot slot tagging of each constructed utterance in the set. A joint slot detection across all of the constructed utterances in the set can be performed, and likelihood scores of the various slot taggings for each constructed utterance in the set can be combined. The top-ranking slot or slots may then be selected or confirmed to identify the most-relevant slot(s) for the sample input utterance(s) 206.

Once the slot or slots of the sample input utterance(s) 206 have been identified, an automatic utterance generation function 216 of the host device 202 uses the one or more identified slots to generate multiple (and possibly numerous) additional training utterances that are associated with the same or substantially similar user intent as the sample input utterance(s) 206. For example, the automatic utterance generation function 216 can retrieve, from the database 214, training utterances that were previously used with one or more of the pre-built skills. The one or more pre-built skills here can represent any of the pre-built skills in the database 214 having at least one slot that matches or has been otherwise mapped to at least one slot of the sample input utterance(s) 206. Thus, the training utterances used with those pre-built skills will likely have suitable words or phrases for those slots that can be used to generate additional training utterances associated with the sample input utterance(s) 206.

The automatic utterance generation function 216 may use any suitable technique to generate the additional training utterances that are associated with the sample input utterance(s) 206. In some embodiments, the automatic utterance generation function 216 uses a syntactic parser (such as a Stanford parser) to parse a sample input utterance 206 and identify a verb and a main object in the utterance 206. For instance, in the utterance "find a five star hotel near San Jose," the word "find" can be identified as the verb, and the word "hotel" can be identified as the main object based on the parser tree. Segments (one or more words or phrases of the input utterance 206) before and/or after the identified verb and main object may be identified (possibly as slots as described above), and various permutations of different segments from the retrieved training utterances from the database 214 may be identified and used to generate the additional training utterances. Thus, for example, assume one or more skills in the database 214 identify "nearby" and "close" as terms used in @location slots and "great" and "high rating" as terms used in @rating slots. The automatic utterance generation function 216 may use this information to generate multiple additional training utterances such as "find a great hotel nearby" and "find a close hotel with a high rating."

In some situations, the training utterances retrieved from the database 214 may not be segmented in an expected manner. For example, in some cases, it may be expected or desired that the retrieved training utterances from the database 214 be divided into segments, where each segment is associated with a single slot and a single slot value. If training utterances retrieved from the database 214 are not segmented in the expected manner, an automatic utterance segmentation function 218 may be used to properly segment the retrieved training utterances prior to use by the automatic utterance generation function 216. In some embodiments, the automatic utterance segmentation function 218 uses slot annotations to identify candidate segments in each retrieved training utterance such that each segment contains one slot. In other embodiments, a dependency parser tree (which may be associated with the parser used by the automatic utterance generation function 216) can be used to extract subtrees in order to correct the candidate segments. The segmented training utterances may then be used by the automatic utterance generation function 216 to generate the additional training utterances.

The additional training utterances produced by the automatic utterance generation function 216 are provided to an NLU training function 220, which uses the additional training utterances (and possibly the sample input utterance(s) 206) to train an NLU engine 222 for the new skill. For example, the additional training utterances can be used with a machine learning algorithm to identify different ways in which the same user intent can be expressed. The information defining the one or more instructions or user demonstrations 208 can also be used here to train the NLU engine 222 how to perform one or more actions to satisfy the user intent. Note that since the training utterances retrieved from the database 214 and used to generate the additional training utterances can be annotated, the additional training utterances produced by the automatic utterance generation function 216 can also represent annotated training utterances. The additional training utterances and the newly-trained NLU engine 222 for the new skill may then be stored in the database 214 as a new pre-built skill, which may allow future new skills to be generated based at least partially on the updated information in the database 214. The newly-trained NLU engine 222 can also be placed into use, such as by a digital personal assistant.

It should be noted that while various operations are described above as being performed using one or more devices, those operations can be implemented in any suitable manner. For example, each of the functions in the host device 202 or the electronic device 204 can be implemented or supported using one or more software applications or other software instructions that are executed by at least one processor of the host device 202 or the electronic device 204. In other embodiments, at least some of the functions in the host device 202 or the electronic device 204 can be implemented or supported using dedicated hardware components. In general, the operations of each device can be performed using any suitable hardware or any suitable combination of hardware and software/firmware instructions.

Although FIG. 2 illustrates one example of an architecture 200 for automating NLU in skill development, various changes may be made to FIG. 2. For example, various components shown in FIG. 2 can be added, omitted, combined, further subdivided, replicated, or placed in any other suitable configuration according to particular needs. Also, while shown as involving the use of two specific devices 202 and 204 here, the architecture 200 shown in FIG. 2 may be implemented using a single device or other multiple devices.

Figure 3:
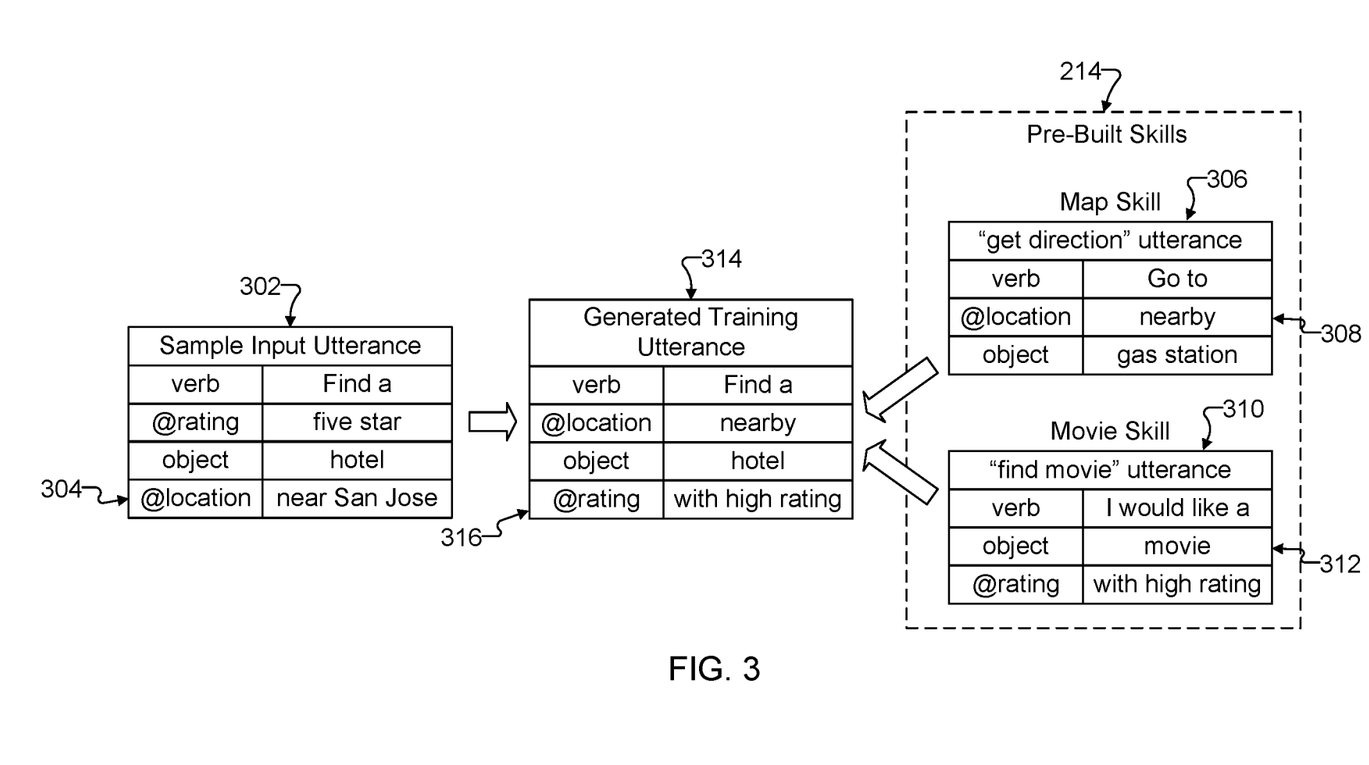
FIG. 3 illustrates an example automated generation of a training utterance for automating NLU in skill development in accordance with various embodiments of this disclosure.

FIG. 3 illustrates an example automated generation of a training utterance for automating NLU in skill development in accordance with various embodiments of this disclosure. For ease of explanation, the example of the automated generation of a training utterance shown in FIG. 3 is described as one way in which the architecture 200 of FIG. 2 may operate to produce an additional training utterance that is provided to the NLU training function 220. However, the architecture 200 of FIG. 2 may operate in any other suitable manner as described in this disclosure to produce additional training utterances.

As shown in FIG. 3, a sample input utterance 302 has been obtained. As described above, the sample input utterance 302 could be spoken by a user and captured using a microphone of the electronic device 204. The sample input utterance 302 could also be typed by a user, such as in a graphical user interface or other input mechanism of the electronic device 204. Note that the sample input utterance 302 may be provided in any other suitable manner. The sample input utterance 302 in this example can be divided into a number of segments 304, such as by a parser. Each segment 304 here includes a key-value pair, where the key identifies a type of the segment (object, verb, or type of slot in this example) and the value identifies the specific value associated with the corresponding key.

Through the processing described above, the host device 202 may determine that the phrase "five star" in the utterance 302 corresponds to the @rating slot and that "near San Jose" in the utterance 302 corresponds to the @location slot. The host device 202 may also access the database 214 and determine that two skills (one having a training utterance 306 with segments 308 and another having a training utterance 310 with segments 312) both have at least one slot that can be mapped to one or more slots of the utterance 302. In this example, the training utterance 306 corresponds to a map-related skill and involves retrieving directions to a specified type of location, which is why the @location slot is present in this training utterance 306. Similarly, the training utterance 310 corresponds to a movie-related skill and involves finding a movie having a specified type of rating, which is why the @rating slot is present in this training utterance 310.

The segment 308 associated with the @location slot in the training utterance 306 contains a value of "nearby," and the segment 312 associated with the @rating slot in the training utterance 310 contains a value of "with high rating." After the training utterances 306 and 310 are retrieved from the database 214 (and possibly segmented by the automatic utterance segmentation function 218), the automatic utterance generation function 216 is able to use the values "nearby" and "with high rating" to generate an additional training utterance 314 with segments 316. In this example, the verb and object segments 316 in the additional training utterance 314 match the verb and object segments 304 in the original sample input utterance 302. However, the segments 316 in the additional training utterance 314 containing the @location and @rating slots now have the location slot value from the training utterance 306 and the rating slot value from the training utterance 310. Ideally, the additional training utterance 314 has the same or substantially similar intent as the sample input utterance 302. As a result, the additional training utterance 314 represents a training utterance that can be fully annotated and that can be used to train an NLU engine 222 to implement a "find hotel" skill.

Note that the same process shown in FIG. 3 may be repeated using a number of training utterances associated with the map and movie skills (and possibly other skills). Also note that the ordering of the segments 316 in the additional training utterances 314 can vary, such as when another utterance 314 is created that says "find a hotel with high rating nearby." In this way, a large number of additional training utterances 314 can be generated based on only one or several input utterances 302, assuming an adequate number of training utterances are available in the database 214 and have slots that can be mapped to slots of the input utterance(s) 302.

As can be seen here, the architecture 200 of FIG. 2 supports the generation of additional training utterances for new skills that may be generally unrelated to the pre-built skills in the database 214. In this example, for instance, the ability to automatically train an NLU engine 222 for a "find hotel" skill is based on additional training utterances generated using pre-existing skills like "get directions" and "find movie" (which are generally unrelated to hotels). This is because the architecture 200 allows use of common or similar slots across skills, even if those skills are not related to one another. This can help significantly in the creation of new skills, even when the new skills are substantially dissimilar to the existing skills defined in the database 214.

Although FIG. 3 illustrates one example of an automated generation of a training utterance for automating NLU in skill development, various changes may be made to FIG. 3. For example, the contents of FIG. 3 are for illustration only. In general, additional training utterances may be produced based on training utterances associated with one or more pre-built skills, and the specific example utterances in FIG. 3 are merely meant to illustrate one way in which the architecture 200 can operate.

Figure 4A:
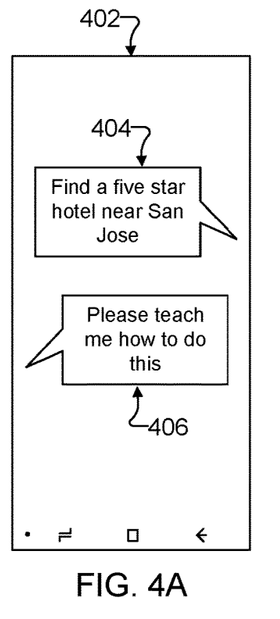
FIGS. 4A, 4B, 4C, 4D, and 4E illustrate a first example approach for providing information related to a new skill in accordance with various embodiments of this disclosure.

FIGS. 4A, 4B, 4C, 4D, and 4E illustrate a first example approach for providing information related to a new skill in accordance with various embodiments of this disclosure. As shown in FIG. 4A, a user of an electronic device 402 is interacting with a digital personal assistant and has submitted a request 404 (such as via spoken utterance or via text entry) to perform a specific command. The digital personal assistant has provided a response 406 indicating that the assistant needs the user to teach the assistant how to perform this command, meaning the command is associated with an unrecognized skill. Note that if the digital personal assistant recognized the command, the assistant could perform one or more actions associated with the command and would not require teaching.

Figure 4B:
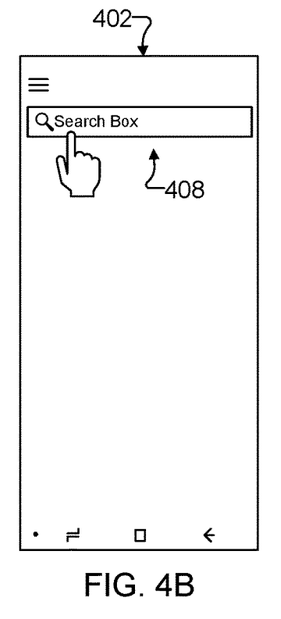
Figure 4C:
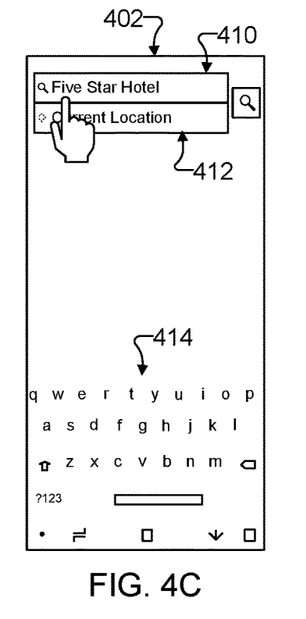
Figure 4D:
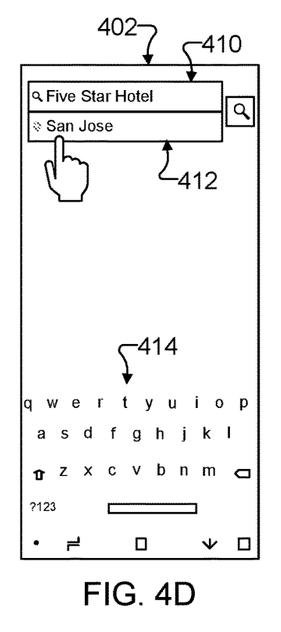
Figure 4E:
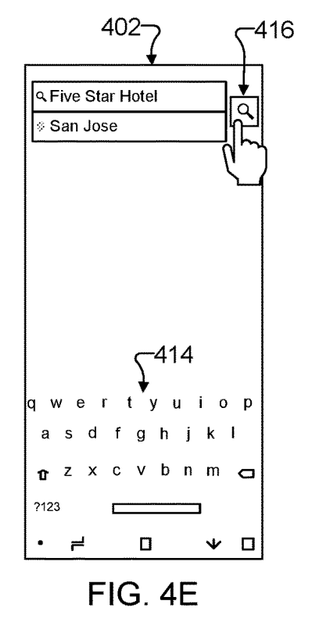

As shown in FIG. 4B, the user has opened a specific application on the user's electronic device 402 (such as the YELP app or other application) having a search bar 408. The user can also touch the search bar 408, indicating that the user wishes to provide input. This causes the application to open two additional text boxes 410 and 412 as shown in FIG. 4C. In FIG. 4C, the user has used a virtual keyboard 414 to type "five star hotel" in the text box 410, since the text box 410 for this application requests one or more keywords to be searched by the application. In FIG. 4D, the user has used the virtual keyboard 414 to type "San Jose" in the text box 412, since the text box 412 for this application requests a location to be searched by the application. Although not shown, the user may also be given the option of pressing a "use current location" selection. In FIG. 4E, the user presses a search button 416, which causes the application to search for five star hotels in or near San Jose.

The user's electronic device 402 may record or otherwise monitor the user's interactions that are shown in FIGS. 4B, 4C, 4D, and 4E. The user's original request 404 may be provided from the electronic device 402 to an NLU system, such as a server 106 or host device 202. The NLU system can process the original request 404 as described above to generate additional training utterances for training an NLU engine 222 for a new skill. The NLU system can also use information defining the user's interactions that are shown in FIGS. 4B, 4C, 4D, and 4E to identify what actions should occur when performing the new skill. In this way, the NLU system can easily learn how to find hotels within a specified area or location without requiring the manual creation and input of numerous training utterances.

Figure 5A:
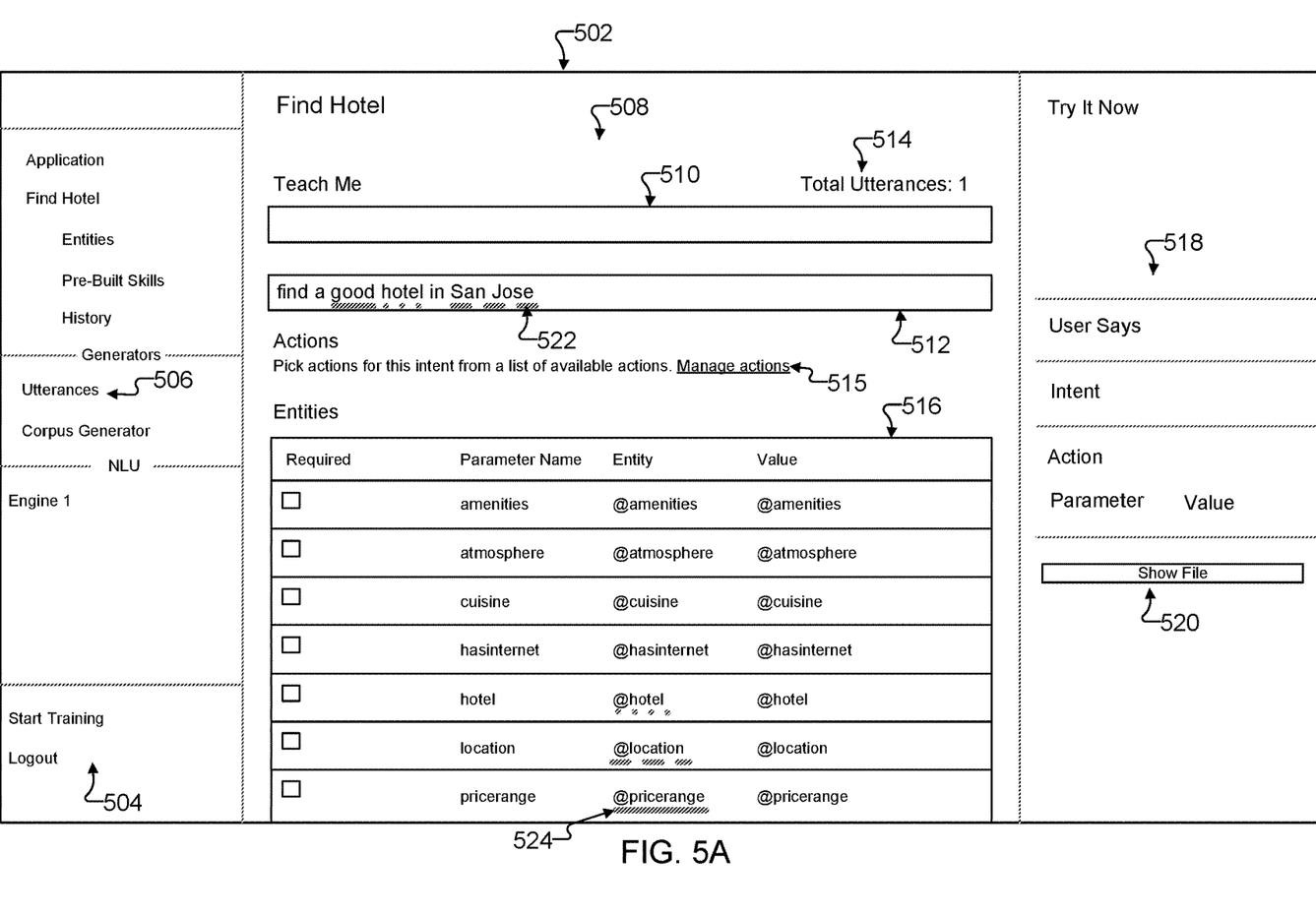
FIGS. 5A and 5B illustrate a second example approach for providing information related to a new skill in accordance with various embodiments of this disclosure.
Figure 5B:
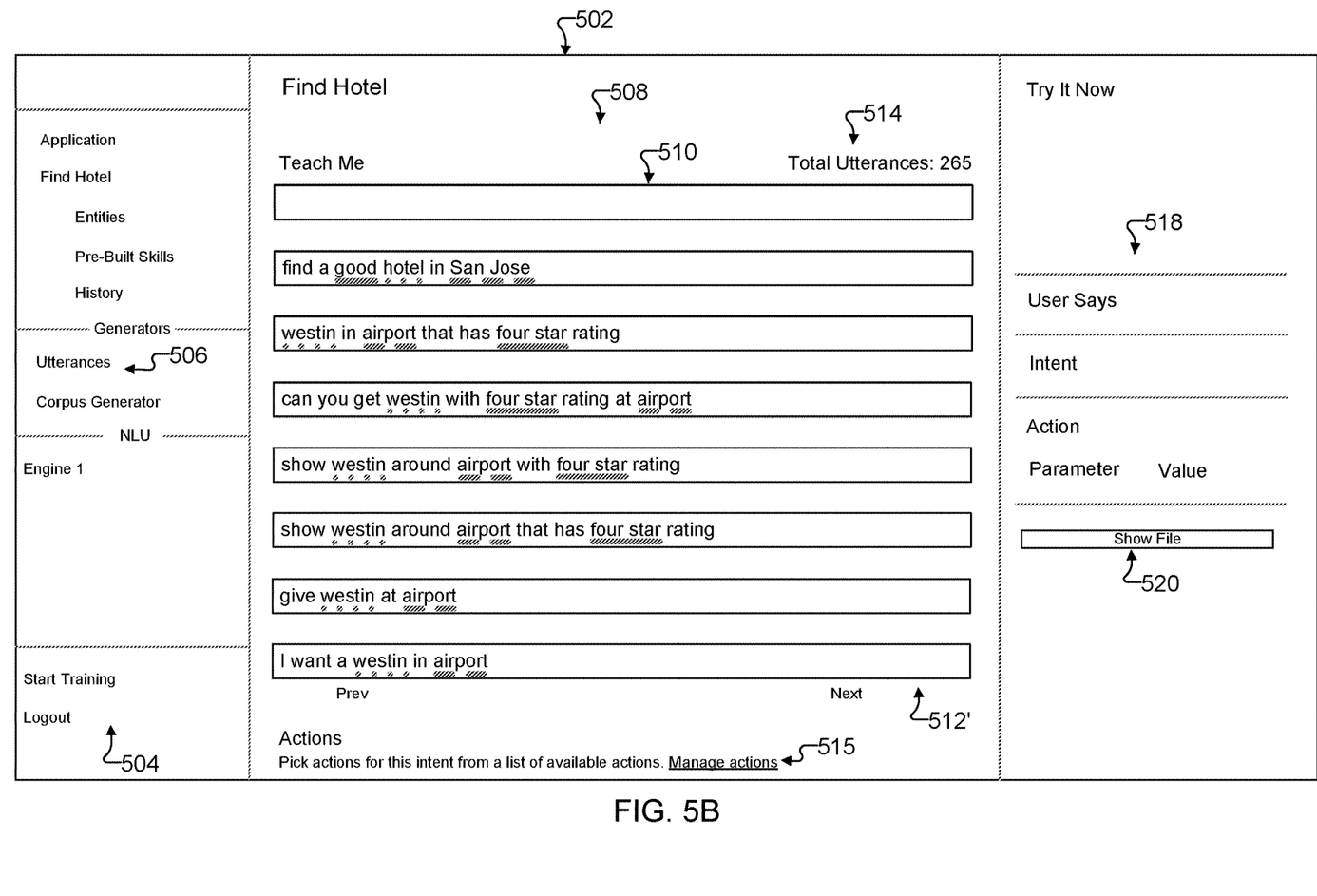

FIGS. 5A and 5B illustrate a second example approach for providing information related to a new skill in accordance with various embodiments of this disclosure. As shown in FIG. 5A, a developer is using a graphical user interface 502 to define a new skill. The graphical user interface 502 includes various options 504 that can be selected by the developer, and in this example the developer has selected an "utterances" option 506. The selection of this option 506 presents the developer with an utterance definition area 508 in the graphical user interface 502. The utterance definition area 508 allows the developer to define utterances to be used to train an NLU engine 222 for a particular skill being created, which in this example is a "find hotel" skill.

As shown here, the utterance definition area 508 includes a text box 510 that allows the developer to type or otherwise define an utterance, as well as an identification of any other utterances 512 that have already been defined. An indicator 514 identifies the total number of utterances that are available for training an NLU engine. In FIG. 5A, there is only one utterance 512 defined, so the indicator 514 identifies a total of one utterance. An action selection area 515 allows the developer to select what action or actions will occur when the new skill is performed. In this example, the action selection area 515 provides a hyperlink that allows the developer to pick from among a list of available actions. The utterance definition area 508 further includes an entity selection area 516, which allows the developer to select what entities may be used with the skill being developed. An entity in the NLU context generally refers to a word or phrase that relates to a known item, such as a name, location, or organization. Often times, entities may be considered specialized slots. Each entity shown in FIG. 5A may be selected or deselected, such as by using checkboxes. Overall, the utterance definition area 508 can be used to receive one or more slot types and slot and intent annotations for an utterance from the developer (which can be provided to the host device 202).

In addition, the graphical user interface 502 includes a test area 518, which allows the developer to evaluate an NLU engine 222 by providing an utterance and verifying if the NLU engine successfully interprets the intent, action, parameter, and value of the provided utterance. If satisfied, the developer can export a file associated with the defined utterances 512 via selection a button 520.

In this example, different indicators 522 may be used in conjunction with the defined utterances 512. In this particular example, the different indicators 522 represent different line patterns under words and phrases, although other types of indicators (such as different highlighting colors or different text colors) may be used. The indicators 522 identify possible slots in the defined utterances 512 and may be generated automatically or identified by the developer. Corresponding indicators 524 may be used in the entity selection area 516 to identify which entities might correspond to the possible slots in the defined utterances 512 and may be useful to the developer. In this example, for instance, the "hotel" term in the defined utterance 512 is associated with a "hotel" entity, and the "hotel" entity may be associated with specific names for different hotel chains (such as WESTIN, RADISSON, and so on). The developer can choose whether specific names are or are not included in automatically-generated utterances.

Without the functionality described in this disclosure, a developer would typically need to manually create numerous utterances 512 in order to properly train an NLU engine 222 for this new skill. However, by using the techniques described in this disclosure, one or a limited number of defined utterances 512 provided by the developer may be taken and processed as described above to produce a much larger number of defined utterances 512' as shown in FIG. 5B. The defined utterances 512' in FIG. 5B represent a variety of utterances having the same general intent as the original utterance 512. Here, at least some of the variations in the defined utterances 512' can be based on any entities selected by the developer in FIG. 5A. Thus, with the techniques described here, developers are able to develop new skills for their applications much faster and easier, and the efforts required by the developers to input training utterances can be significantly reduced. Also, the generated utterances 512' can be produced with automatically annotated intents and slots and can be directly used for NLU training.

Although FIGS. 4A, 4B, 4C, 4D, 4E, 5A, and 5B illustrate examples of approaches for providing information related to a new skill, various changes may be made to these figures. For example, the specific approaches shown here are examples only, and the functionality for automatically generating training utterances and training NLU engines as described in this patent document may be used in any other suitable manner.

Figure 6:
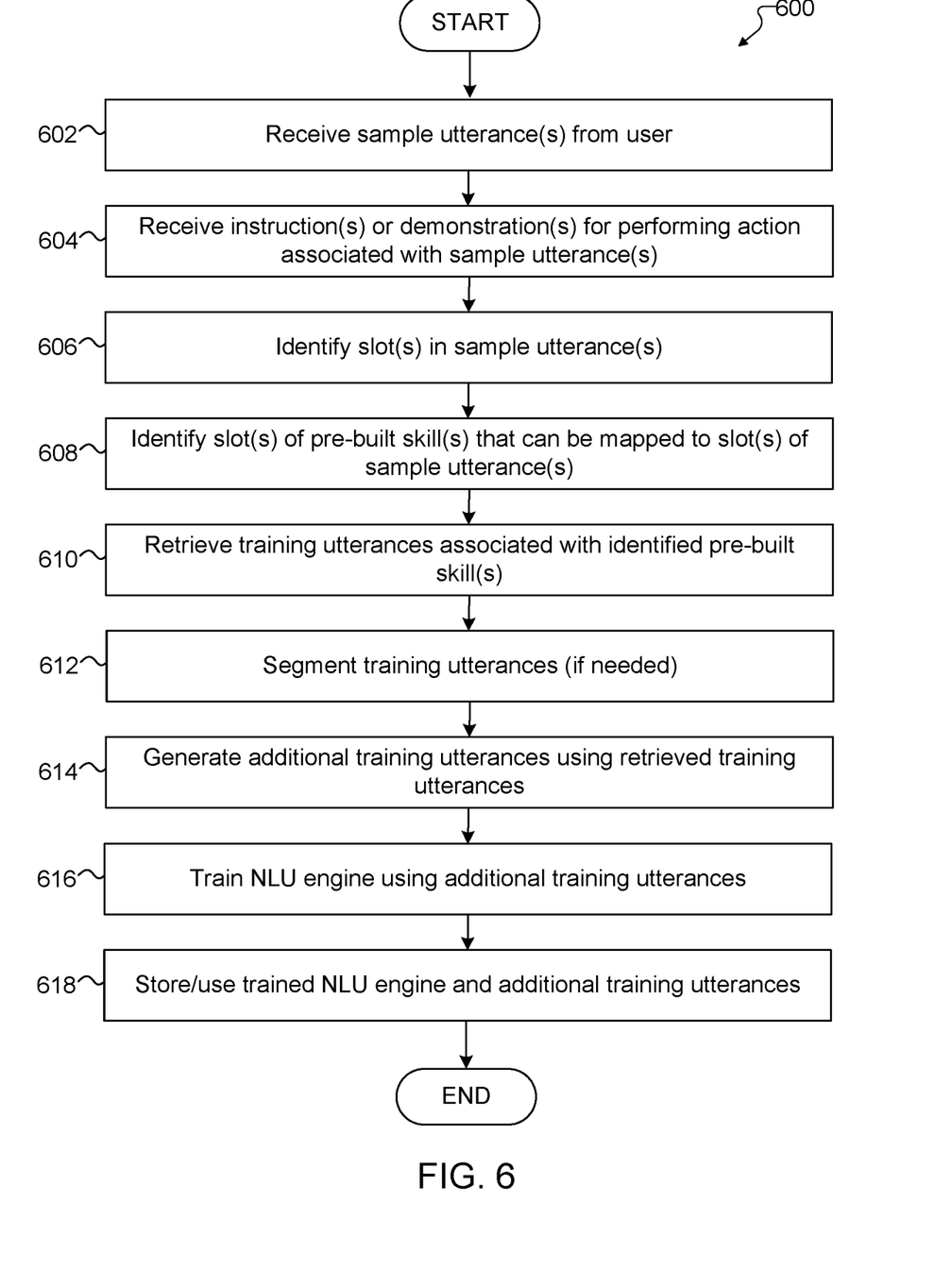
FIG. 6 illustrates an example method for automating NLU in skill development in accordance with various embodiments of this disclosure.

FIG. 6 illustrates an example method 600 for automating NLU in skill development in accordance with various embodiments of this disclosure. For ease of explanation, the method 600 shown in FIG. 6 may be described as being performed using the architecture 200 shown in FIG. 2, which can be used within the network configuration 100 shown in FIG. 1. However, the method 600 of FIG. 6 may be performed using any other suitable device(s) and in any other suitable system(s).

As shown in FIG. 6, one or more sample utterances are received from a user at step 602. From the perspective of the electronic device 204, this may include the electronic device 204 receiving at least one spoken input utterance 206 from the user and digitizing and possibly converting the input utterance(s) 206 into text. This may also or alternatively include the electronic device 204 receiving at least one typed input utterance 206 from the user. From the perspective of the host device 202, this may include the host device 202 receiving information defining the input utterance 206, such as at least one digitized or textual version of the input utterance 206.

One of more instructions or demonstrations for performing at least one action associated with the sample utterance(s) are received from a user at step 604. From the perspective of the electronic device 204, this may include the electronic device 204 receiving clarifying instructions identifying how to perform each step of the new skill associated with the input utterance(s) 206. This may also or alternatively include the electronic device 204 receiving or recording input from the user identifying how at least one application may be used to perform the new skill. From the perspective of the host device 202, this may include the host device 202 receiving information defining the clarifying instructions or the input from the user.

One or more slots in the sample utterance(s) are identified at step 606. This may include, for example, the slot identification function 210 and the automatic slot identification function 212 of the host device 202 identifying one or more slots contained in the input utterance(s) 206. Note that, if necessary, ranked slots or other possible slots may be provided to the user via the electronic device 204 for confirmation or selection of the appropriate slot(s) for the input utterance(s) 206.

One or more slots of one or more pre-built skills that can be mapped to the one or more slots of the sample utterance(s) are identified at step 608. This may include, for example, the slot identification function 210 or the automatic slot identification function 212 of the host device 202 accessing the database 214 to identify the known slots of the pre-built skills. This may also include the slot identification function 210 or the automatic slot identification function 212 of the host device 202 constructing a set of natural language utterances based on the input utterance(s) 206, performing a zero-shot slot tagging operation using the constructed set of utterances, performing joint slot detection across all of the constructed utterances, and combining likelihood scores of the different slot taggings. The top-ranked slot or slots may be sent to the user, such as via the electronic device 204, allowing the user to select or confirm the most-relevant slot(s) for the sample input utterance(s) 206.

Training utterances associated with one or more of the pre-built skills from the database are retrieved at step 610. This may include, for example, retrieving training utterances from the database 214, where the retrieved training utterances are associated with one or more pre-built skills having one or more slots that were mapped to the slot(s) of the input utterance(s) 206. If necessary, the retrieved training utterances are segmented at step 612. This may include, for example, the automatic utterance segmentation function 218 segmenting the retrieved training utterances such that each of the segments of the retrieved training utterances contains one slot at most.

Additional training utterances are generated using the retrieved training utterances at step 614. This may include, for example, the automatic utterance generation function 216 of the host device 202 parsing the input utterance(s) 206 to identify the verb and the main object in the utterance(s) 206. Segments before and/or after the identified verb and main object may be identified, and various permutations of different segments from the retrieved training utterances may be identified and used to generate the additional training utterances. A large number of permutations may be allowed, depending on the number of retrieved training utterances from the database 214.

The additional training utterances are used to train an NLU engine for the new skill at step 616. This may include, for example, the NLU training function 220 of the host device 202 using the additional training utterances from the automatic utterance generation function 216 to train an NLU engine 222. The NLU engine 222 can be trained to recognize that the intent of the original input utterance(s) 206 is the same or similar for all of the additional training utterances generated as described above. The resulting additional training utterances and trained NLU engine can be stored or used in any suitable manner at step 618. This may include, for example, storing the additional training utterances and trained NLU engine 222, along with information defining how to perform the one or more actions associated with the skill, in the database 214 for use in developing additional skills. This may also include placing the trained NLU engine 222 into operation so that a digital personal assistant or other system can perform the one or more actions associated with the skill when requested.

Although FIG. 6 illustrates one example of a method 600 for automating NLU in skill development, various changes may be made to FIG. 6. For example, while shown as a series of steps, various steps in FIG. 6 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   receiving, from an electronic device, information defining a user utterance associated with a user intent and a skill, the skill associated with one or more actions to be performed by the electronic device to satisfy the user intent, wherein the skill is not recognized by a natural language understanding (NLU) engine;

receiving, from the electronic device, information defining the one or more actions for performing the skill in order to satisfy the user intent;

identifying, using at least one processor, multiple known skills each having one or more slots that map to at least one word or phrase in the user utterance;

retrieving, using the at least one processor, training utterances associated with the multiple known skills, wherein at least two of the retrieved training utterances are associated with different known skills;

segmenting, using the at least one processor, the retrieved training utterances into segments;

creating, using the at least one processor, a plurality of additional utterances by selecting different combinations of at least some of the segments of the retrieved training utterances in place of different words or phrases in the user utterance, the plurality of additional utterances associated with the user intent and the skill; and training, using the at least one processor, the NLU engine using the plurality of additional utterances so that the NLU engine is able to recognize the skill associated with the user intent.

2. The method of claim 1, wherein identifying the multiple known skills comprises:
parsing the user utterance associated with the skill;
identifying at least one slot in the parsed user utterance; and
identifying the one or more slots of the multiple known skills as being associated with the at least one identified slot in the parsed user utterance.

3. The method of claim 1, wherein:
each known skill is associated with annotated training utterances;
each training utterance is associated with both intent and slot annotations; and
the plurality of additional utterances comprises at least some of the slot annotations.

4. The method of claim 1, wherein the information defining the one or more actions for performing the skill comprises one or more instructions for performing the one or more actions that are received from a user.

5. The method of claim 1, wherein the information defining the one or more actions for performing the skill comprises a demonstration of one or more user interactions with at least one application for performing the skill.

6. An apparatus comprising:
at least one memory; and
at least one processor operatively coupled to the at least one memory and configured to:
receive, from an electronic device, information defining a user utterance associated with a user intent and a skill, the skill associated with one or more actions to be performed by the electronic device to satisfy the user intent, wherein the skill is not recognized by a natural language understanding (NLU) engine;
receive, from the electronic device, information defining the one or more actions for performing the skill in order to satisfy the user intent;
identify multiple known skills each having one or more slots that map to at least one word or phrase in the user utterance;
retrieve training utterances associated with the multiple known skills, wherein at least two of the retrieved training utterances are associated with different known skills;
segment the retrieved training utterances into segments;
create a plurality of additional utterances by selecting different combinations of at least some of the segments of the retrieved training utterances in place of different words or phrases in the user utterance, the plurality of additional utterances associated with the user intent and the skill; and
train the NLU engine using the plurality of additional utterances so that the NLU engine is able to recognize the skill associated with the user intent.

7. The apparatus of claim 6, wherein, to identify the multiple known skills, the at least one processor is configured to:
parse the user utterance associated with the skill;
identify at least one slot in the parsed user utterance; and
identify the one or more slots of the multiple known skills as being associated with the at least one identified slot in the parsed user utterance.

8. The apparatus of claim 6, wherein:
each known skill is associated with annotated training utterances;
each training utterance is associated with both intent and slot annotations; and
the plurality of additional utterances comprises at least some of the slot annotations.

9. The apparatus of claim 6, wherein the information defining the one or more actions for performing the skill comprises one or more instructions for performing the one or more actions that are received from a user.

10. The apparatus of claim 6, wherein the information defining the one or more actions for performing the skill comprises a demonstration of one or more user interactions with at least one application for performing the skill.

11. A non-transitory machine-readable medium containing instructions that when executed cause at least one processor of a host device to:
receive, from an electronic device, information defining a user utterance associated with a user intent and a skill, the skill associated with one or more actions to be performed by the electronic device to satisfy the user intent, wherein the skill is not recognized by a natural language understanding (NLU) engine;
receive, from the electronic device, information defining the one or more actions for performing the skill in order to satisfy the user intent;
identify multiple known skills each having one or more slots that map to at least one word or phrase in the user utterance;
retrieve training utterances associated with the multiple known skills, wherein at least two of the retrieved training utterances are associated with different known skills;
segment the retrieved training utterances into segments;
create a plurality of additional utterances by selecting different combinations of at least some of the segments of the retrieved training utterances in place of different words or phrases in the user utterance, the plurality of additional utterances associated with the user intent and the skill; and
train the NLU engine using the plurality of additional utterances so that the NLU engine is able to recognize the skill associated with the user intent.

12. The non-transitory machine-readable medium of claim 11, wherein the instructions that when executed cause the at least one processor to identify the multiple known skills comprise:
instructions that when executed cause the at least one processor to:
parse the user utterance associated with the skill;
identify at least one slot in the parsed user utterance; and
identify the one or more slots of the multiple known skills as being associated with the at least one identified slot in the parsed user utterance.

13. The non-transitory machine-readable medium of claim 11, wherein:
each known skill is associated with annotated training utterances;
each training utterance is associated with both intent and slot annotations; and
the plurality of additional utterances comprises at least some of the slot annotations.

14. The non-transitory machine-readable medium of claim 11, wherein the information defining the one or more actions for performing the skill comprises at least one of:
one or more instructions for performing the one or more actions that are received from a user; and
a demonstration of one or more user interactions with at least one application for performing the skill.

15. The method of claim 1, wherein the segments of the at least two retrieved training utterances associated with the different known skills include different combinations of keys.

16. The method of claim 1, wherein the training utterances associated with the multiple known skills are retrieved from a database.

17. The apparatus of claim 6, wherein the segments of the at least two retrieved training utterances associated with the different known skills include different combinations of keys.

18. The apparatus of claim 6, wherein the at least one processor is configured to retrieve the training utterances associated with the multiple known skills from a database.

19. The non-transitory machine-readable medium of claim 11, wherein the segments of the at least two retrieved training utterances associated with the different known skills include different combinations of keys.

20. The non-transitory machine-readable medium of claim 11, wherein the instructions when executed cause the at least one processor to retrieve the training utterances associated with the multiple known skills from a database.

* * * * *